April 4, 1967  K. REHM  3,312,464
DEVICE FOR CONVEYING A STACK OF FLAT ARTICLES SINGLY
Filed Dec. 14, 1964  5 Sheets-Sheet 4

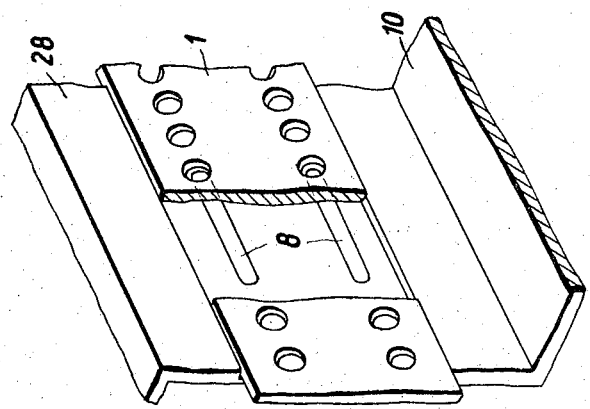
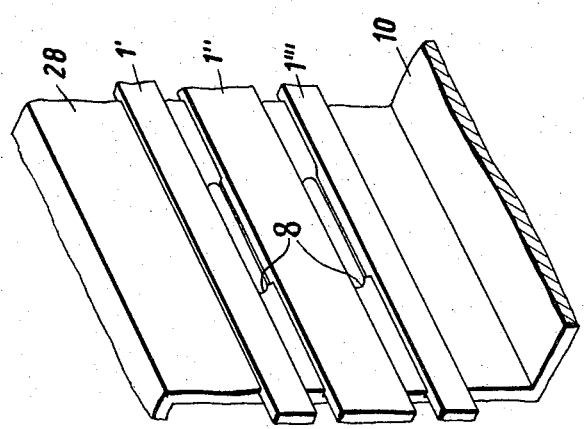

INVENTOR
Karl Rehm

BY Spencer & Kaye
ATTORNEYS

United States Patent Office 3,312,464
Patented Apr. 4, 1967

3,312,464
DEVICE FOR CONVEYING A STACK OF
FLAT ARTICLES SINGLY
Karl Rehm, Konstanz, Germany, assignor to Telefunken
Patentverwertungs-G.m.b.H., Ulm (Danube), Germany
Filed Dec. 14, 1964, Ser. No. 417,898
Claims priority, application Germany, Dec. 13, 1963,
T 25,254
25 Claims. (Cl. 271—26)

The present invention relates generally to a device for the controlled separation of flat articles to be conveyed, such as documents in particular, from a stack by means of a conveying device which is provided with suction apertures and driven continuously, and, more particularly, to such a device wherein the particular article, when it is to be separated from the stack is brought into engagement with the conveying device by means of suction air, while during the remaining time, when the article is in the position of rest, engagement between the article and the conveying device is prevented.

Such devices are already known. In one of these devices, a drum provided with two grooves is mounted at one side of the stack to be separated. A forked hollow arm projects into the grooves in the mentioned drum from the side, which arm is connected to a suction unit and each of its two front ends has a suction aperture and is rounded in accordance with the curvature of the surface of the drum. Mounted in each of the two suction apertures is a movable restraining finger which is moved by a piston subject to a controlled excess pressure. In the position of rest, the two restraining fingers project beyond the front edge of the suction apertures. The articles are moved by suction from the stack by the stream of air at the suction apertures toward the restraining fingers and held firmly in this position. Following a separating instruction, the restraining fingers are retracted into the plane of the suction apertures, the attracted document moves in the direction of movement of the restraining fingers caused by the suction air, and it finally comes into engagement with the surface of the drum by which is is conveyed away.

Such an arrangement suffers from the disadvantage, however, of having a limited separating speed. In order to be able to move the articles by suction from the stack to the restraining fingers, a comparatively powerful suction unit is necessary, but this is a disadvantage when the restraining fingers are retracted into the suction apertures and the articles have been taken over by the drum and conveyed away. The high static negative pressure which develops at the suction apertures, after an article has been attracted, and which holds the article firmly against these apertures, like the relatively slow movement of the articles from the stack to the restraining fingers, prevents a rapid controlled separation of the flat articles.

With these defects of the prior art in mind, it is a main object of the present invention to provide a device which performs the separating operation with a low power unit.

Another object is to provide a device of the character described which prevents the suction pressure from passing through the first document and affecting the next one which frequently causes double withdrawals.

A further object is to provide a device for the separating operation which maintains the angle of deflection of the items from the position of rest to the separating position as small as possible to aid in obtaining a high operating speed.

These objects and others ancillary thereto are accomplished in accordance with preferred embodiments of the present invention wherein a source of blast-forming air is provided, as is a source of suction pressure, as well as control means to allow an air blast to act on the articles through the ports instead of the suction air. This air blast prevents the articles in their position of rest from coming into engagement with the conveying device.

As a further feature of the invention, the control means comprise a cylindrical cavity into which open a passage for blast-forming air and a passage for suction air. A control member is provided in the cylindrical cavity in such a manner that it forms either a first chamber into which open the air-blast passage and the apertures in the conveying device, or a second chamber into which open the suction air passage and the apertures in the conveying device.

The invention is based on recognition of the fact that an air blast flowing toward the flat article from below through the mentioned ports or apertures produces a small air cushion between the conveying device and the article situated closest to this in the pile. This air cushion prevents this article from coming into engagement with the conveying device. On the other hand, this air cushion is so small that it disappears immediately when the air blast is cut off. In order to be able to switch the suction air and the blast-forming air on and off quickly, it is advantageous to position these in the closest possible proximity to the apertures in order to keep the volume of the chamber as small as possible. The chamber referred to is the one whose pressure has to be altered on switching over from suction to air blast or from air blast to suction. Such a construction is particularly advisable because the building up of a specific excess or negative pressure always takes a certain time which is naturally greater when the volume whose pressure is to be varied is greater. The speed of separation is largely determined by the magnitude of this volume whose pressure is to be varied, because unless the excess or negative pressure is brought to the necessary value, the separation is unreliable.

Additional objects and advantages of the present invention will become apparent upon consideration of the following description when taken in conjunction with the accompanying drawings in which:

FIGURE 3a is a fragmentary perspective view of one type of conveying device.

FIGURE 3b is a fragmentary perspective view of another type of conveying device with part of the belt broken away to show the ports.

FIGURE 5 is a elevational view of the outside of the cylinder of the arrangement of FIGURE 4.

Before considering the drawings in more detail, it should be noted that according to a further feature of the present invention, it is proposed to use a disc as a control member in a cylindrical cavity. This disc is mounted inclined on a shaft which is pivotable through a specific angular range and is arranged coaxially within the cylindrical cavity. The disc then divides the cavity into two chambers, one of the chambers in the cavity always being in communication with the apertures. The pivotal angle of the disc preferably amounts to 180°.

An advantageous further feature of the invention is that the two chambers, which are formed by the disc in the cylindrical cavity, are alike.

As a result of these last-mentioned features of the invention, it follows that one of the two chambers formed by the disc in the cylindrical cavity is always at negative pressure and the other at an excess pressure. Also, when the disc is changed over from one position to the other, the correct excess or negative pressure appears immediately at the apertures in the conveying device as a result of the constant volumes in the two chambers. The volume of the suction ports or apertures themselves has no effect in comparison with the particular volume of half the cavity which is connected thereto and produces substantially no variation in the pressure built up in one half of the cavity. This construction of the device according to the invention results in a very low time constant for the effective alteration of the pressure acting on the flat articles, as a result of which a very high separating speed can be achieved.

In order to prevent a pressure build-up from developing in the second half of the cavity during the period when reduced pressure is applied to the apertures, this part of the cylindrical cavity is connected to a second passage through which the blast-forming air from the first passage can escape again. The opening of this passage may advantageously be closed by the disc when it is in the position in which an air blast is applied to the apertures, in order to prevent the escape of air during the period when excess pressure is applied to the underside of the articles.

The conveying means used according to the invention are either a plurality of endless or conveyor belts arranged in parallel between which are the apertures from the cylindrical cavity, or a continuously perforated endless conveyor belt, the holes in which coact with the apertures in the cylindrical cavity.

A very advantageous further development of the invention provides a cylinder as conveying means. This cylinder is provided with suction apertures and is driven continuously, interiorly thereof is a stationary cylinder which contains the cylindrical cavity with the pivotable disc and which also has suction apertures which are in communication with the suction apertures of the driven cylinder.

Figure 1:
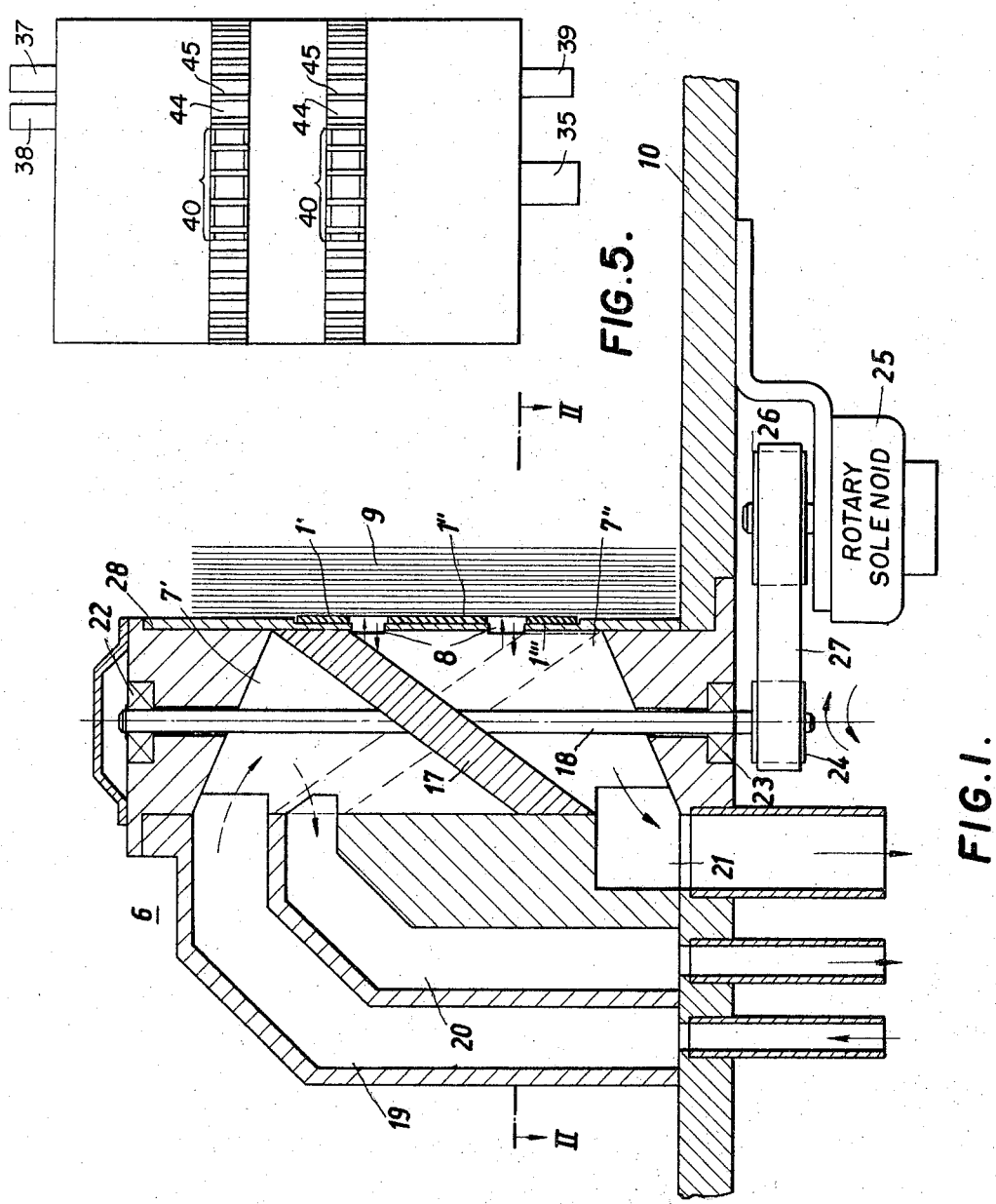
FIGURE 1 is a sectional view through one embodiment of the invention.
Figure 2:
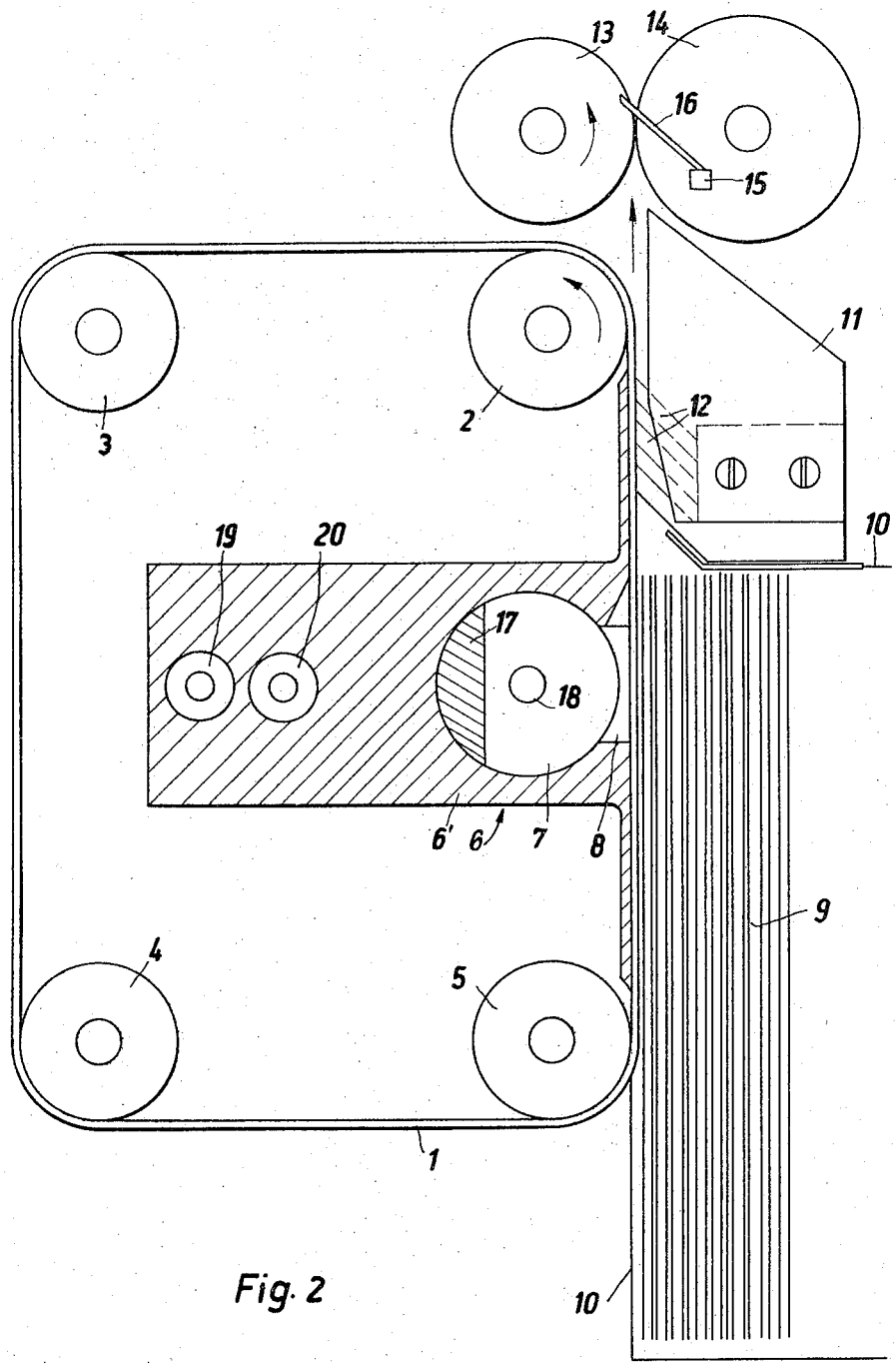
FIGURE 2 is a sectional view taken substantially along the plane defined by reference line II—II of FIGURE 1.

With more particular reference to the drawings, FIGURE 2 shows the general arrangement in plan view, partially in section. An endless separating belt 1 extends over four guide rollers 2, 3, 4, 5, of which the roller 2 is driven continuously. The separating belt may either be formed by three simple parallel conveyor belts 1', 1", 1"' arranged one next to the other with a space between them (see FIGURE 3a) or by a single continuous perforated belt 1a (see FIGURE 3b). The construction of the endless separating belt illustrated in FIGURE 3a is used in the embodiment shown in FIGURES 1 and 2.

The entire suction device, which contains a cylindrical cavity 7 and suction ports 8, is designated 6 in FIGURE 2. The stacked documents 9, which stand on edge on a platform 10 (see also FIGURE 1) are at the side of the separating belt opposite to the suction device 6. A stripper 11 is provided which has fingers 12 which prevent the documents from leaving the device at an undesirable moment or which prevent two documents from leaving at the same time. Following the stripper 11, at the exit from the device, are two friction rollers 13 and 14. The last-mentioner roller engages and is spring-biassed toward the roller 13, which is continuously driven. The distance of these two rollers 13 and 14 from the suction slots 8 is less than the length of a document. Finally, a switch 15 is provided and has an actuating arm 16 which projects into the conveying path for the conveyed items and detects the arrival of a document between the conveying rollers 13 and 14.

The construction of the suction device 6 can be seen in detail from FIGURE 1. The cylindrical cavity 7 is divided into two equal parts 7' and 7" by a disc 17 which is mounted obliquely in the cavity and acts as a valve. This disc 17 is mounted on a shaft 18 which is pivotable through 180° and which is arranged coaxially with the central axis of the cavity. The outer edge of the disc is shaped in such a manner that the whole of its circumference bears against the wall of the cavity formed in body 6' and so satisfactorily separates the two compartments 7' and 7" from one another in an airtight manner. Altogether three passages lead into this cylindrical cavity. Air for forming air blasts flows through two passages 19, 20 which open into the part 7' and suction air flows in the suction air passage 21 out of the part 7" of the cavity. When the disc 17 is in the position shown in solid lines, the suction apertures 8 are in communication with the suction air passage 21, that is, reduced pressure prevails at the suction apertures and sucks the documents against the separating belts.

On the other hand, if the disc 17 assumes the position shown in broken lines, the suction part 7' of the cavity is in communication both with the suction apertures 8 and with the air-blast passage 19. As a result, excess pressure prevails at the suction apertures 8 and holds the documents away from the separating belts. The purpose of the provision of a second air-balst passage 20 is to prevent an unwanted bulid-up of pressure in the part 7' of the cavity in the operating condition illustrated in solid lines in FIGURE 1, which would result if the air were prevented from escaping. When the disc 17 moves into the second position shown in broken lines, this accumulation of pressure would cause an excessive pushing away of the documents from the separating belts. On the other hand, this passage 20 opens into the part 7' of the cavity at such a point that the disc 17 covers its opening when it is in the position shown in broken lines. Thus, when the disc is in this position, the blast-forming air is prevented from escaping through the passage 20, instead of producing the required excess pressure at the suction apertures 8. This covering of the passage 20 when the disc 17 is in the one position is not, however, basically necessary and may be omitted with suitable construction and arrangement of the passage 20 at the cavity.

The shaft 18 of the disc 17 is mounted at the bearing points 22 and 23 and carries a pulley 24 at one end. A turning magnet or rotary solenoid 25 is provided, on the spindle of which is mounted a pulley 26 which is connected to the pulley 24 through a drive belt 27. This turning magnet causes the shaft 18 to turn through a total of 180° in both directions of rotation. Since turning member which likewise travels over the suction slots 8 skilled in the art, the details of such a device are not disclosed. Such a device is manufactured by Ledex Inc. of Dayton, Ohio.

FIGURE 3a shows that the belts 1', 1", 1"' run in grooves in a supoprting surface 28 and the suction slots 8 are set back in the supporting surface. In FIGURE 3b, a continuously perforated belt 1a is provided as a separating member which likewise travels over the suction slots 8 in a groove in the supporting surface 28.

Let it be assumed that the disc 17 in the arrangement described is in the position shown in broken lines and that blast-forming air is flowing through the passage 19 and suction air through the passage 21. The inlet of the passage 20 is covered by the disc 17. As a result, excess pressure, which is produced by the air blast, is set up at the suction apertures 8. Due to the escape of air through the apertures 8, a small air cushion is formed between the belts 1', 1", 1"' and the document closest thereto, thus holding the document away from the belts which are moving continuously. The restraining fingers 12 prevent the document from possibly receiving a slight movement impulse in the conveying direction as a result of the air flow and moving slowly out of the separating device.

If a separating instruction signal reaches the rotary magnet 25, this is reversed and turns the disc 17 through 180° into the solid line position shown in FIGURE 1.

While the disc 17 was in the previous position, the required negative pressure was already produced by the suction passage 21 in the part of the cavity 7" which was not connected to the suction apertures and this negative pressure is now immediately set up at the suction apertures 8 after the switching over of the disc 17. This causes the excess pressure still present in these apertures to disappear. Since the volume of the suction ports is small in comparison with the volume of the suction compartment, substantially no reduction of the negative pressure in the suction compartment 7" occurs during the moment of switching over the disc 17. All the negative pressure of suction compartment 7" is set up immediately at the suction apertures 8 and renders possible a fast switching over.

Through this negative pressure, the document situated closest to the belts 1', 1", 1''' is brought into engagement with the latter and is conveyed out of the device in the direction of the arrow, past the stripper 11. The stripper fingers 12 do not produce a resistance sufficiently strong to hold back the document which is in engagement with the belts and merely prevent a second document, which may be clinging to the conveyed document, from leaving the device together with it.

After the disc 17 has been brought into the solid line position shown, the passage 20 is exposed. Through it, the pressure build-up in the part 7' of the cavity as a result of the continuous supply of blast-forming air through the passage 19 declines until an equilibrium is established which only permits a slight excess pressure in the part 7' of the cavity. This equilibrium can be shifted in one direction or the other by varying the mutual relationship between the diameters of the two passages 19 and 20.

If the leading edge of the document to be separated has left the device in the meantime and reached the friction rollers 13 and 14, a restoring pulse is applied to the turning magnet through the actuation of the switch 15. This pulse again reverses the turning magnet as a result of which the disc 17 is turned into the position shown in broken lines and an air blast is formed again at the ports 8.

During this time, the trailing edge of the document leaving the device is still in front of the suction apertures 8. Thus, no further document can be brought into engagement with the separating belts until the first document has left the device. Only then can a new separating cycle begin.

Figure 4:
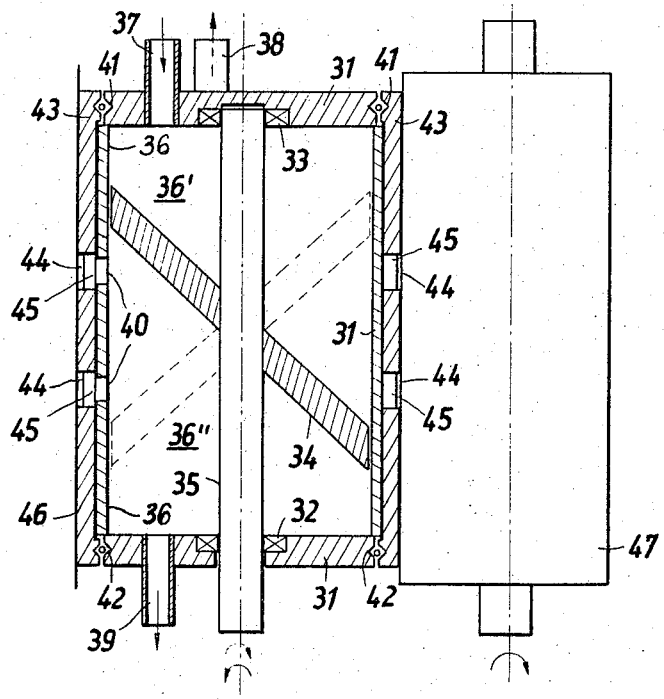
FIGURE 4 is a schematic sectional view of another embodiment of the present invention.
Figure 6:
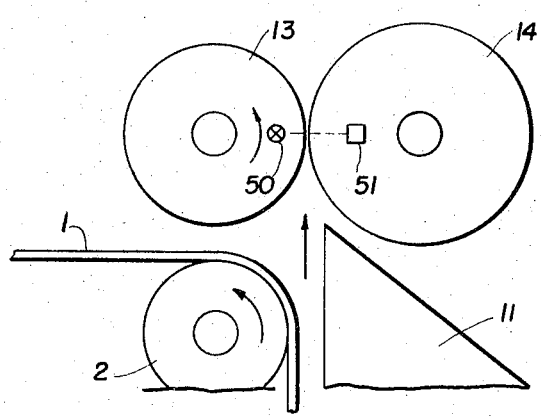
FIGURE 6 shows a detail from FIGURE 2, in which a light-barrier arrangement is substituted for micro-switch 15.

A second embodiment of a device according to the invention is shown in FIGURE 4. A continuously rotating drum with suction ports distributed over the whole circumference is used as a separating member instead of one or more belts. The design of the cylindrical cavity is very similar to that in the device shown in FIGURE 1. The drive of the drum is effected through a continuously driven friction drum.

The stationary cylinder defining the cylindrical cavity is designated 31 in FIGURE 4. It contains the bearings 32, 33, in which the shaft 35 carrying the disc 34 is supported. The cylindrical cavity 36 is divided by the disc 34 into two parts 36' and 36" of equal size. The two passages 37 and 38 conveying the air-blast-forming air and corresponding to the passages 19 and 20 in FIGURE 1, lead into the cavity part 36'. The suction passage 39, which corresponds to the passage 21 in FIGURE 1, opens into the cavity part 36". The wall of the stationary cylinder 31 contains two suction ports or apertures 40 and its two end walls each contain a bearing ring 41 and 42 for the actual separating drum 43 which rotates coaxially around the stationary cylinder. The bearings 41 and 42 are illustrated in the form of balls running in two conical grooves. The separating drum 43 preferably has a friction covering and is of grid-like construction at the axial height of the suction apertures 40, the individual apertures 44 being separated from one another only by narrow webs 45 (FIGURE 5). A document 46 is attracted by the suction apertures 44. The turning magnet causing the drive of the disc 34 is not illustrated. The drive of the movable cylinder is effected by means of a friction drum 47, indicated diagrammatically, which is driven continuously.

Figure 7:
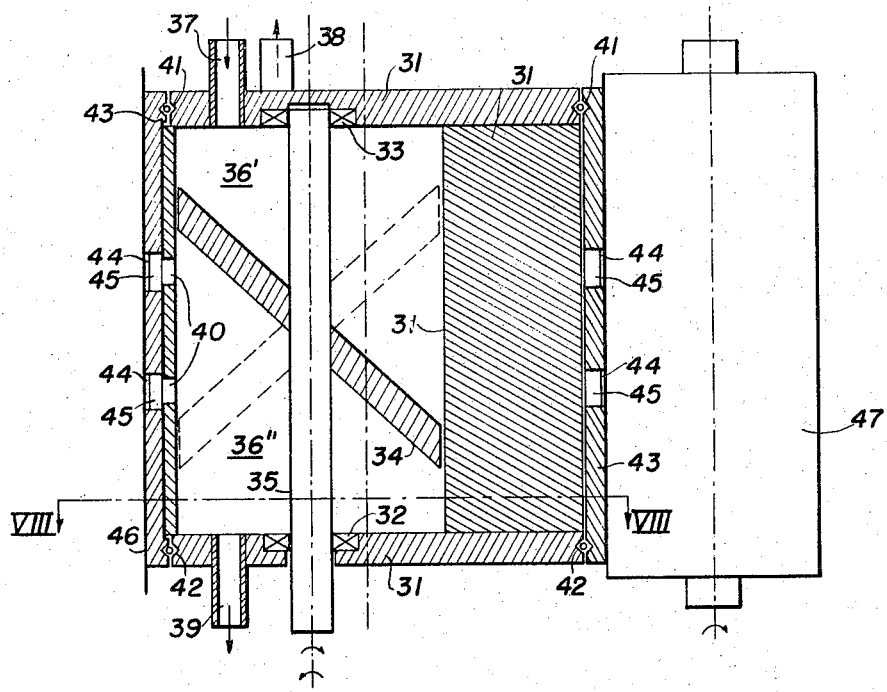
FIGURE 7 is a shematic sectional view of another embodiment of the present invention.
Figure 8:
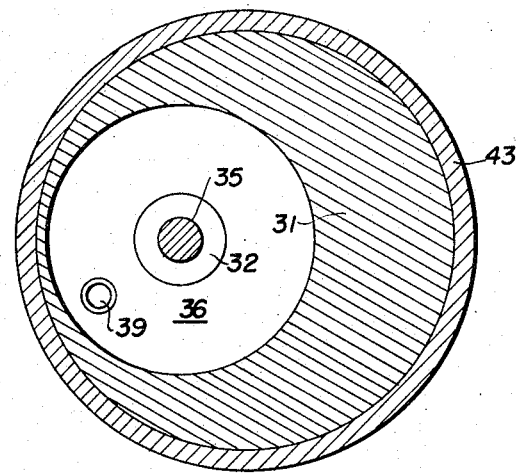
FIGURE 8 is a sectional view taken along the plane defined by reference line VIII—VIII of FIGURE 7.

Although the stationary and the movable cylinders of the device are arranged coaxially in FIGURE 4, it is perfectly possible, within the scope of the invention, to arrange the stationary part eccentrically in relation to the movable part, FIGURES 7, 8, in which case only that part of the shell of the first-mentioned cylinder which comprises the suction apertures, has to be mounted close to the shell of the movable part. Finally, it is also possible, within the scope of the invention, to provide the passages 37, 38 and 39 inside the shaft 35 and to construct the shaft 35 in a grid-like manner at the height of the outlet openings from the passages. A condition for this is that the outlet openings from the passages should lead into the same part of the cylindrical cavity as in FIGURE 4. With such an arrangement it would be possible to effect the drive of the movable cylinder not through a friction drum but directly by means of a drive pulley mounted on the shaft 35.

Also, instead of micro-switch 15, a light barrier could be used, such as a light source 50 and a photo-responsive element 51.

It will be understood that the above description of the present invention is susceptible to various modifications, changes and adaptations, and the same are intended to be comprehended within the meaning and range of equivalents of the appended claims.

What is claimed is:

1. In a device for the controlled separation of flat articles, and particularly documents, to be conveyed from a stack by means of a continuously driven conveying device provided with suction ports and wherein the particular article to be separated from the stack is, for conveying purposes, brought into engagement with the conveying device by means of suction air, while engagement between the articles and the conveying device is prevented during the remaining time while it is in the position of rest, the improvement comprising: a source of blast-forming air; said conveying device being continuously disposed adjacent said stack; and control means for allowing an air blast to act on the articles through said ports instead of the suction air, which air blast prevents the articles in their position of rest from coming into engagement with the conveying device.

2. A device for the controlled separation of flat articles to be conveyed from a stack, comprising, in combination:

conveying means provided with ports and continuously disposed adjacent to a stack of flat articles;

first means for removing air from said ports to cause an article from the stack to adhere to and be carried away by said conveying means;

second means for delivering blast-forming air to said ports to prevent any articles of the stack from contacting said conveying means; and control means for selectively connecting said first and second means to said ports.

3. A device as defined in claim 2 wherein said control means includes a body having a cylindrical cavity to which said first and second means are connected, a control member mounted in said cavity to form first and second chambers and for selectively connecting (1) the ports and the first means and (2) the ports and the second means.

4. A device for the controlled separation of flat articles to be conveyed from a stack, comprising, in combination:

conveying means provided with ports and disposed adjacent to a stack of flat articles;

first means for removing air from said ports to cause an article from the stack to adhere to and be carried away by said conveying means;

second means for delivering blast-forming air to said ports to prevent any articles of the stack from adhering to said conveying means; and control means for selectively connecting said first and second means to said ports, and including a body having a cylindrical cavity to which said first and second means are connected, a control member mounted in said cavity to form first and second chambers and for selectively connecting (1) the ports and the first means and (2) the ports and the second means, and a shaft pivotable through a certain angular range and arranged coaxially with the central axis of the cylindrical cavity, said control member being a disc mounted obliquely on said shaft to divide the cavity into said two chambers one of which is in communication with said ports at any one time.

5. A device as defined in claim 4 wherein the pivotal angular range of the disc shaft is 180°.

6. A device as defined in claim 4, wherein the two chambers which are formed in the cavity by said disc are alike.

7. A device as defined in claim 4 comprising third means connected to said cavity, through which the blast-forming air which is not needed can escape.

8. A device as defined in claim 4 comprising a turning magnet for driving the disc shaft.

9. A device as defined in claim 8, wherein the turning magnet is connected to the shaft of said disc.

10. A device as defined in claim 2 wherein the conveying means is formed by a plurality of endless conveyor belts arranged parallel with one another and between which the ports are arranged.

11. A device as defined in claim 2 wherein the conveying means is a continuous perforated endless conveyor belt.

12. A device as defined in claim 4 wherein said conveying means includes a continuously driven hollow cylinder, the body defining said cylindrical cavity being a stationary cylinder disposed within said driven cylinder and containing the said cavity with the pivotable disc, said driven cylinder having apertures therein which may be in communication with said ports.

13. A device as defined in claim 12 wherein the stationary cylinder is arranged coaxially in the cylinder which is driven continuously.

14. A device as defined in claim 12 wherein the continuously driven cylinder is mounted along two circumferential lines of the stationary cylinder.

15. A device as defined in claim 12 comprising third means connected to said cavity through which the blast-forming air which is not needed can escape.

16. A device as defined in claim 15 wherein said first, second and third means are arranged at the end of the stationary cylinder.

17. A device as defined in claim 15 wherein said first, second and third means are arranged within said shaft which has apertures at an appropriate height.

18. A device as defined in claim 12 wherein said driven cylinder has a friction covering and further comprising a friction drum which runs continuously and coacting with the friction covering of the movable cylinder and forming its drive.

19. A device as defined in claim 17 wherein the continuously driven cylinder is mounted on the shaft carrying the disc.

20. A device as defined in claim 19 wherein the drive of the movable cylinder is provided through a hollow shaft mounted on the shaft carrying the disc.

21. A device as defined in claim 12 wherein the movable cylinder has grid-like structure with narrow webs at an axial height which corresponds to the height of the ports on the stationary cylinder.

22. A device as defined in claim 4 comprising means for driving said shaft; discharge conveyor means for engaging a document to be separated after its leading edge has left the conveying means but before the training edge of the document has left the ports; and switch means positioned to be actuated by the leading edge of the document to detect when the document is gripped by said discharge conveyor means for sending a reversing signal to said shaft driving means.

23. A device as defined in claim 22 wherein said discharge conveyor means includes two friction rollers which are in engagement with one another under spring pressure.

24. A device as defined in claim 22 wherein the switch means comprise a light barrier which is arranged in the plane connecting the two axes of the conveyor means.

25. A device as defined in claim 22 wherein the switch means comprise a micro-switch, having an actuating arm which projects into the conveying path of the documents in the region of said discharge conveyor means.

References Cited by the Examiner

UNITED STATES PATENTS

| 3,127,167 | 3/1964 | Rabinow et al. | 271—27 |
| 3,127,168 | 3/1964 | Kramer | 271—29 |
| 3,131,929 | 5/1964 | Rehm | 271—26 |

ROBERT B. REEVES, *Primary Examiner.*

STANLEY H. TOLLBERG, *Examiner.*